United States Patent
Jovenall et al.

(10) Patent No.: US 11,312,402 B2
(45) Date of Patent: Apr. 26, 2022

(54) SYSTEMS AND METHODS FOR SAFETY LOCKING OF OPERATOR CONTROL UNITS FOR REMOTE CONTROL MACHINES

(71) Applicant: Cattron North America, Inc., Warren, OH (US)

(72) Inventors: Jeremy Jovenall, Mercer, PA (US); André Brousseau, Quebec (CA)

(73) Assignee: CATTRON NORTH AMERICA, INC., Warren, OH (US)

( * ) Notice: Subject to any disclaimer, the term of this patent is extended or adjusted under 35 U.S.C. 154(b) by 569 days.

(21) Appl. No.: 15/995,511

(22) Filed: Jun. 1, 2018

(65) Prior Publication Data
US 2018/0281834 A1 Oct. 4, 2018

Related U.S. Application Data

(63) Continuation-in-part of application No. PCT/US2016/060264, filed on Nov. 3, 2016, which is
(Continued)

(51) Int. Cl.
*B61L 3/12* (2006.01)
*B61L 17/00* (2006.01)
(Continued)

(52) U.S. Cl.
CPC .............. *B61L 3/127* (2013.01); *B61L 17/00* (2013.01); *B61L 23/00* (2013.01); *B61L 27/20* (2022.01);
(Continued)

(58) Field of Classification Search
None
See application file for complete search history.

(56) References Cited

U.S. PATENT DOCUMENTS

| 5,448,479 A | 9/1995 | Kemner et al. |
| 5,947,423 A * | 9/1999 | Clifton ............... B61L 27/0038 246/62 |

(Continued)

FOREIGN PATENT DOCUMENTS

| CA | 2913800 A1 | 6/2017 |
| EP | 1186904 A2 | 3/2002 |
| WO | WO-2017/095589 A1 | 6/2017 |

OTHER PUBLICATIONS

International Search Report and Written Opinion for PCT/US2016/060264 filed Nov. 3, 2016 which claims priority to the instant application, dated Feb. 22, 2017, 14 pages.
(Continued)

*Primary Examiner* — Peter D Nolan
*Assistant Examiner* — Michael F Whalen
(74) *Attorney, Agent, or Firm* — Harness, Dickey & Pierce, P.L.C.; Anthony Fussner

(57) ABSTRACT

According to various aspects, exemplary embodiments are disclosed of systems and methods for safety locking of operator control units for remote control locomotives. In an exemplary embodiment, a system includes a machine control unit located on a locomotive to control operation of the locomotive, a primary operator control unit including a primary network interface configured to transmit received input commands to the machine control unit to control motion of the locomotive, and a secondary operation control unit including a secondary network interface and a secondary input interface. The secondary operator control unit is configured to operate in a secondary role that does not include motion control of the locomotive, and the secondary operator control unit is configured to transmit a lock command to the machine control unit to inhibit movement of the
(Continued)

locomotive in response to receiving a lock command input at the secondary input interface.

20 Claims, 6 Drawing Sheets

Related U.S. Application Data a continuation of application No. 14/955,405, filed on Dec. 1, 2015, now abandoned.

(51) Int. Cl.
    *B61L 23/00*      (2006.01)
    *G06F 21/62*      (2013.01)
    *B61L 27/20*      (2022.01)
    *B61L 27/40*      (2022.01)
    *G05D 1/00*      (2006.01)

(52) U.S. Cl.
    CPC ............ *B61L 27/40* (2022.01); *G05D 1/0011* (2013.01); *G06F 21/629* (2013.01)

(56) References Cited

U.S. PATENT DOCUMENTS

| | | | |
|---|---|---|---|
| 6,222,484 | B1 | 4/2001 | Seiple et al. |
| 7,239,943 | B2 | 7/2007 | Peltz |
| 7,529,201 | B2 | 5/2009 | Aiken, II et al. |
| 8,509,964 | B2 | 8/2013 | Ecton et al. |
| 2004/0120305 | A1 | 6/2004 | Aiken et al. |
| 2004/0129840 | A1 | 7/2004 | Horst |
| 2005/0075764 | A1 | 4/2005 | Horst et al. |
| 2005/0125081 | A1* | 6/2005 | Ota ........................ G08C 17/02 700/17 |
| 2007/0145196 | A1 | 6/2007 | Davenport et al. |
| 2009/0248220 | A1* | 10/2009 | Ecton .................... G08C 17/00 701/2 |
| 2009/0248223 | A1* | 10/2009 | Ecton .................... G08C 23/04 701/2 |
| 2010/0277310 | A1 | 11/2010 | Imae |
| 2012/0086868 | A1 | 4/2012 | Takaya |
| 2013/0066490 | A1 | 3/2013 | Liberatore |
| 2015/0163212 | A1 | 6/2015 | Saegusa |
| 2016/0124428 | A1 | 5/2016 | Nutaro et al. |
| 2016/0232336 | A1 | 8/2016 | Pitschel et al. |
| 2017/0123413 | A1 | 5/2017 | Ye et al. |
| 2017/0151969 | A1 | 6/2017 | Jovenall et al. |
| 2017/0269594 | A1 | 9/2017 | Sydnor |
| 2017/0300709 | A1 | 10/2017 | Tzeng et al. |
| 2018/0210439 | A1* | 7/2018 | Brooks ................... B61C 17/12 |

OTHER PUBLICATIONS

U.S. Office Action for U.S. Appl. No. 14/955,405 (published as 20170141969) which is the parent application to the instant application; dated Jan. 10, 2018, 12 pages.

European Search Report for European application No. 16871250.3 which claims priority to the same parent application as the instant application; dated Dec. 6, 2018, 4 pages.

* cited by examiner

SYSTEMS AND METHODS FOR SAFETY LOCKING OF OPERATOR CONTROL UNITS FOR REMOTE CONTROL MACHINES

CROSS-REFERENCE TO RELATED APPLICATIONS

This application is a continuation-in-part of PCT International Application No. PCT/US2016/060264 filed Nov. 3, 2016 (published as WO2017/095589 on Jun. 8, 2017), which, in turn, is a PCT International Application of U.S. patent application Ser. No. 14/955,405 filed Dec. 1, 2015. The entire disclosures of the above applications are incorporated herein by reference.

FIELD

The present disclosure generally relates to systems and methods for safety locking of operator control units for remote control machines, and more specifically (but not exclusively) to reducing a chance of accidentally disabling a safety lock mode of an operator control unit.

BACKGROUND

This section provides background information related to the present disclosure which is not necessarily prior art.

Rail yard operations typically involve moving large numbers of locomotives and rail cars, often by remote control. It can be challenging to safely maintain and/or work on a remote control locomotive due to the possibility of accidental motion commands being sent to the locomotive while a technician or operator is in dangerous proximity of the locomotive.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

The inventors have recognized that rail yard operators seek rapid, safe, and efficient control solutions for rail cars and rail yard operations. According to some aspects of the present disclosure, an Operator Control Unit (OCU) is provided for controlling and monitoring a plurality of distributed machines, e.g., remotely controlled locomotives (RCLs) moving in a rail yard, etc. The described OCU has the capability to engage a safety lock which disables motion controls and other related controls while maintaining access to the core controls, operations, and information of the connected RCLs. It should be noted, however, that although various embodiments are described with reference to RCLs and rail yard operations, the disclosure is not so limited. Aspects of the disclosure may be practiced in connection with various types of remote control machines distributed in various types of environments.

Figure 1:
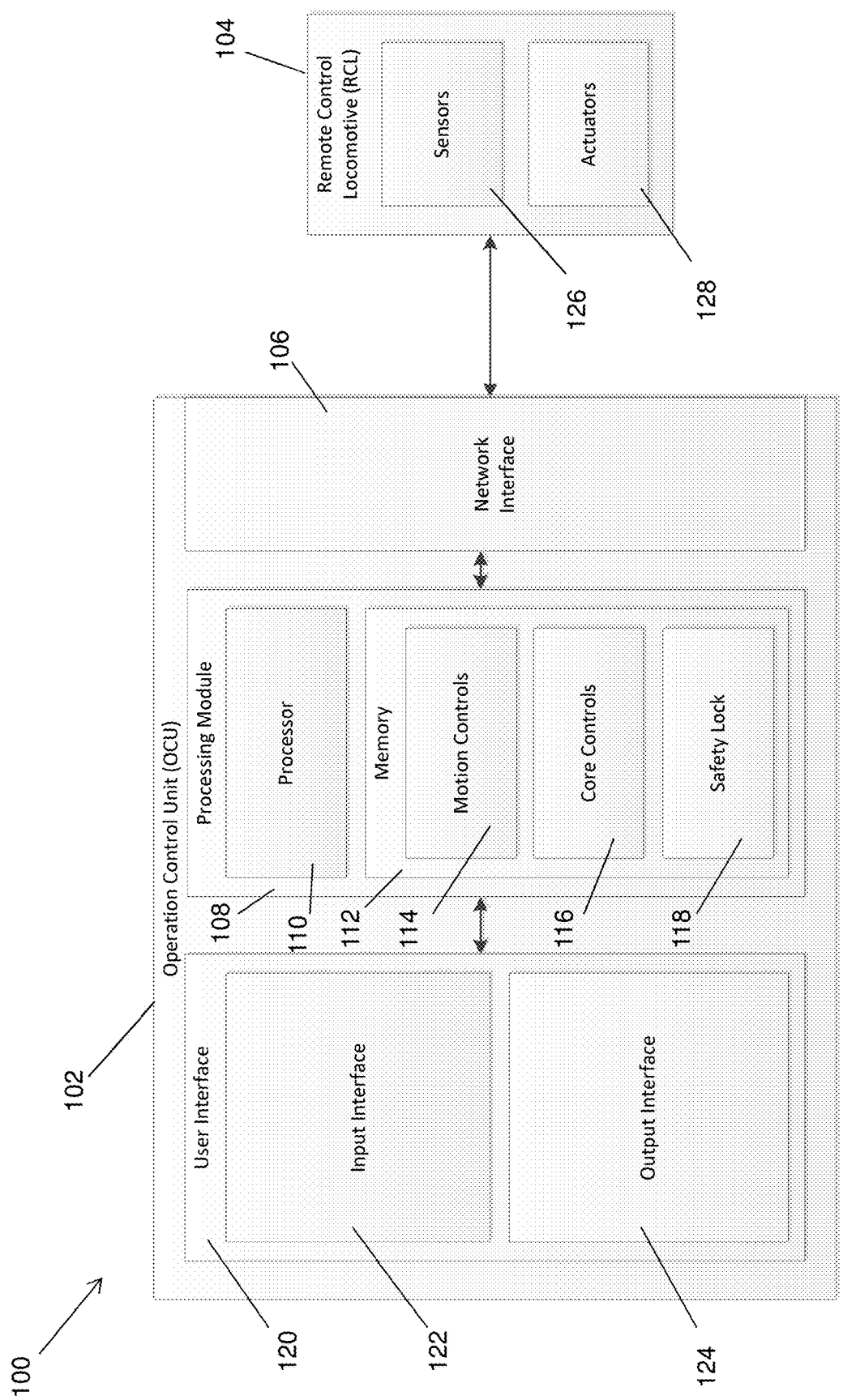
FIG. 1 is a diagram of various components of an exemplary Operator Control Unit (OCU) and an associated Remote Control Locomotive (RCL)

With reference to the figures, FIG. 1 illustrates an example embodiment of an OCU system 100 including an OCU 102 for controlling one or more RCLs 104 (broadly, remote control machines) via a network interface 106. The RCL 104 is a remotely controllable locomotive and generally includes one or more sensors 126, e.g., speed sensors, brake sensors, GPS receivers, etc. An RCL 104 may additionally or alternatively include one or more remotely controllable actuators 128, e.g., throttles, brakes, direction control (e.g., forward, reverse, etc.) etc. The sensors and/or actuators are configured to provide data to and/or receive data from a network interface of the RCL 104.

The network interface 106 of the OCU 102 may include, without limitation, a wired network adapter, a wireless network adapter, a mobile telecommunications adapter, or other device capable of communicating to one or more different networks. The RCL 104 may also include a network interface that enables communication with the OCU 102 via the network interface 106. The network interface 106 may be capable of communication via a variety of network types, including, without limitation, a wired and/or wireless network, a local area network (LAN), a wide area network (WAN) (e.g., the Internet, etc.), a mobile network, a virtual network, and/or another suitable public and/or private network capable of supporting communication among two or more of the illustrated components of the system 100, or any combination thereof. In some embodiments, the network interface 106 communicates via multiple networks.

The OCU 102 may include a processing module 108 including a processor 110 and memory 112. The processor 110 may include, without limitation, one or more processing units (e.g., in a multi-core configuration, etc.), including a general purpose central processing unit (CPU), a microcontroller (MCU), a reduced instruction set computer (RISC) processor, an application specific integrated circuit (ASIC), a programmable logic circuit (PLC), a gate array, and/or any other circuit or processor capable of the operations and functions described herein. The above examples are exemplary only, and are not intended to limit in any way the types of processors suitable for example embodiments.

The processor 110 and memory 112 of OCU 102 are devices that enable information, such as executable instructions and/or other data, to be stored and retrieved. The memory may include one or more computer-readable media, such as, without limitation, dynamic random access memory (DRAM), static random access memory (SRAM), read only memory (ROM), erasable programmable read only memory (EPROM), solid state devices, flash drives, CD-ROMs, thumb drives, tapes, flash drives, hard disks, and/or any other type of volatile or nonvolatile physical or tangible computer-readable media.

Furthermore, in various embodiments, computer-executable instructions may be stored in the memory for execution by the processor to cause the processor to perform one or more of the functions described herein, such that the memory is a physical, tangible, and non-transitory computer-readable media. It should be appreciated that the memory may include a variety of different memories, each implementing one or more of the functions or processes described herein.

In various embodiments and as further described below, the processor 110 and memory 112 are configured to perform as a software agent of the OCU 102, e.g., to receive raw data from sensors, actuators, and/or other data sources of the RCL 104 via the network interface 106. Unless otherwise indicated, the term "raw data" refers to primary source data in its original digital form, including data originally produced in digital form and data converted from its original analog form to its original digital form. The data may include data points such as velocity, velocity set point, direction, brake pressure, throttle level, etc.

Additionally, the processor and memory may send data, commands, etc. to the RCL 104 in order to monitor and/or control the RCL 104. In various embodiments, the memory 112 may include computer executable instructions for execution by the processor 110 of the OCU 102. The instructions may include instructions for execution of controls, including motion controls 114, core controls 116, and a safety lock module 118. The OCU 102 also includes a user interface 120 that may include multiple elements, such as an input interface 122 and an output interface 124.

The motion controls 114 of the OCU 102 provide a user of the OCU 102 the ability to control the motion of the connected RCL 104. Example motion controls 114 may include a direction control (e.g., reverser, etc.), a throttle control for controlling the speed of the RCL 104, one or more brake controls, etc. The motion controls 114 may include software and/or firmware that provides control interfaces for display on the output interface 124 and/or the input interface 122, software and/or firmware that formulates commands that may be understood by the RCL 104, software and/or firmware that may receive and translate data pertaining to the motion of the RCL 104 such that the data may be provided to a user of the OCU 102 in an understandable form, etc.

The core controls 116 of the OCU 102 provide a user of the OCU 102 the ability to control and/or monitor non-motion functionality of the RCL 104. For example, the core controls 116 may include tilt protection, a tilt extend operation, capability of commanding an operator emergency, some brake operations, horn and/or bell operation, etc. The OCU 102 may include an accelerometer and may be attached to a vest worn by an operator (e.g., remote control operator (RCO), etc.). If the operator tilts the OCU 102 beyond a specified length of time, the RCL 104 may cause an emergency brake application and cause a "man-down" message over a two way radio. But if the operator knows ahead of time that the OCU 102 needs to be tilted for a time greater than the specified threshold (e.g. to throw a track switch, etc.), the operator has the ability to extend the tilt timer as long as certain inputs are satisfied. This allows an operator to lean over on purpose without causing a man-down fault.

The RCL 104 may include two pneumatic braking systems. An independent brake applies pressure to move the brake shoes onto the wheels of the locomotive. An automatic brake requires that the pressure on the automatic brake system is reduced in order for the brake to apply pressure to the cylinders. In common applications, the automatic brake may be used to apply and release brakes. In an emergency brake application, the independent brake may be set to maximum and the automatic brake vented to atmosphere to cause maximum braking pressure. The automatic brake may also add additional pressure to the brake cylinders to increase pressure on the brake shoes of the RCL 104. The emergency brake application can be caused by the operator, the system (e.g., in case of certain faults, etc.), a disconnect of the hoses between rolling stock that has the train brake laced and pneumatically cut in, etc.

When the RCL 104 is set to "STOP", it may not be possible for the operator to release the independent brake. When the OCU 102 is locked, it may not permit the operator to change the speed selection from STOP. When locked, the OCU 102 can prevent the operator from changing the automatic brake setting, with possible exceptions of penalties, emergency brakes, etc. Changing brake settings, even by relatively small amounts, can have surprising effects when combined with the effects of gravity on the entire RCL 104, especially when part or all of the train is on a grade. Accordingly, brakes may be "frozen" while locked, with the possible exception of penalty applications.

The core controls 116 may also include data monitoring of the connected RCL 104, which may include RCL statuses, sensor data, etc. But when the OCU 102 is locked, the operator should be focused on completing any tasks that may put the operator in a potentially harmful situation (including tasks that required the locked state in the first place), and getting back to a position of safety. Accordingly, in some embodiments, the locked state OCU 102 may not provide information to the operator other than a notification that the OCU 102 is locked.

The safety lock module 118 provides software and/or firmware which interact with the motion controls 114 and the core controls 116 to lock the OCU 102 and prevent the connected RCL 104 from moving. This safety lock module provides enhanced safety for technicians/operators and others who work in close proximity to the RCL 104 when the RCL 104 is stationary. For instance, a technician may need to do maintenance to the RCL 104, requiring the technician to work on top of, between, or beneath train cars and/or the RCL 104 itself. The operator of the OCU 102 may activate the safety lock module 118 to render the RCL 104 immobile, but maintain access to functionality provided by the core controls 116.

The safety lock module 118 includes software and/or firmware, in combination with the input interface 122, which enables a user of the OCU 102 to enable the safety lock mode and disable the safety lock mode. Enabling and/or disabling the safety lock mode may require one or more steps and/or interactions with the OCU 102 through the input interface 122. The safety lock module 118 may provide instructions to a user of the OCU 102 via the output interface 124 to guide the user regarding how to enable and/or disable the safety lock mode of the OCU 102. It should be understood that, generally, the safety lock mode is intended to inhibit a user of the OCU 102 from accidentally disabling the safety lock mode when a technician/operator or other person is in dangerous proximity to the connected RCL 104. In some embodiments, the method provided for enabling the safety lock mode may be simple, while the method for disabling the safety lock mode may be more difficult. Exemplary methods of enabling and disabling the safety lock mode on the OCU 102 are described below.

It should be understood that, in some embodiments, enabling and/or disabling the safety lock mode may include steps and/or requirements intended to prevent certain users from enabling and/or disabling the safety lock mode. For instance, the safety lock mode of an OCU in some embodiments may include turning a key in a turn-key mechanism to a lock position, such that the safety lock mode can only be disabled by a user with the key. Upon inserting the key and turning it back to an unlock position, the safety lock mode may be disabled.

The input interface 122 of the OCU 102 may include a variety of types of input devices, controls, and the like, such as buttons, levers, switches, physical turn-key mechanisms, keyboards, mice, touchscreens, microphones (and voice recognition technology), keycard readers, wireless network interfaces (Bluetooth, near-field communication (NFC)), etc.

The output interface 124 of the OCU 102 may include a variety of types of output devices, controls, and the like, such as lights (light emitting diodes (LEDs) or the like), speakers, bells, horns, LCD screens, other types of screens, etc.

In some embodiments, the input interface 122 and output interface 124 largely overlap in the form of a touchscreen which enables a user to view various information associated with the OCU 102 and connected RCLs 104 and to issue commands to the RCLs 104 by interacting with the touchscreen via touch. The touchscreen may present a user with a series of menus which may be navigated in order to access information and commands.

In embodiments for use in rail yard environments, users of the OCU 102 may include, e.g., rail yard operators monitoring and/or controlling locomotive movement and conditions, etc. The RCL 104 may send at least some of the raw sensor and/or actuator data to the OCU 102. In some embodiments, user(s) may use the OCU 102 to send data, e.g., sensor configuration data, commands, etc. to the RCL 104.

Figure 2:
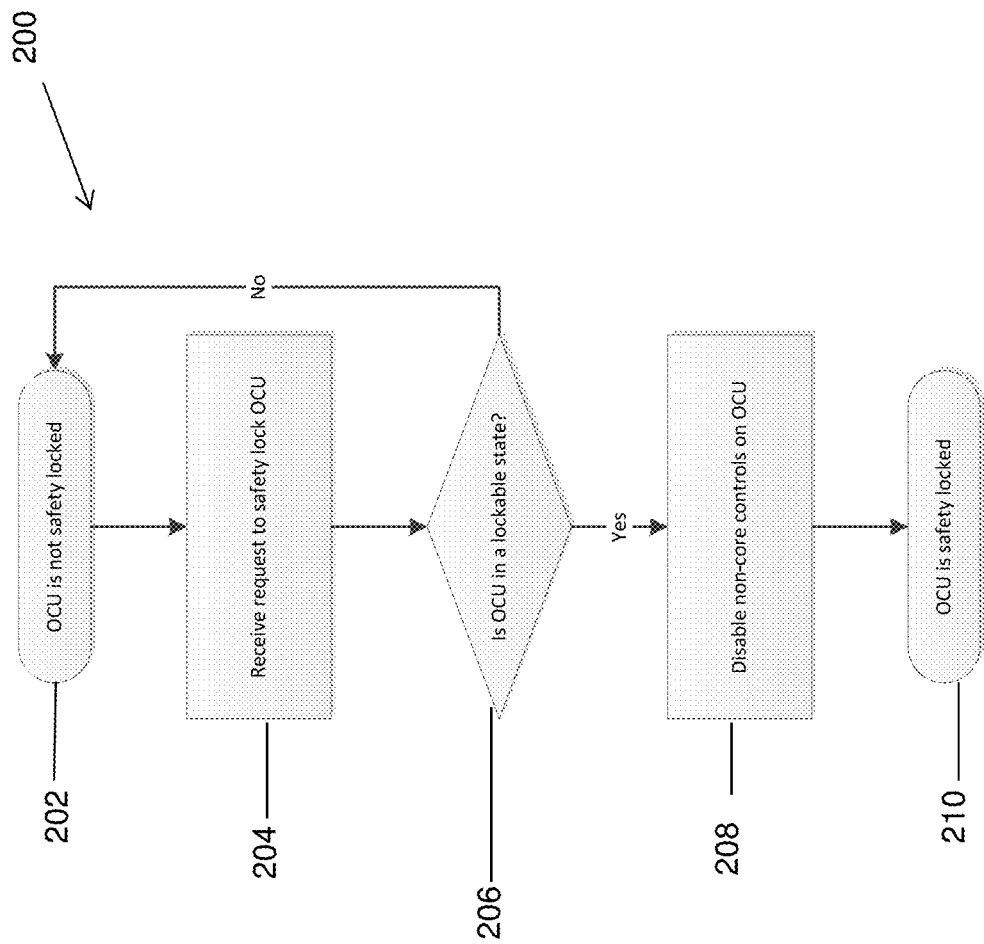
FIG. 2 is a flowchart of a method for safety locking the OCU of FIG. 1.

FIG. 2 illustrates a general exemplary method 200 for enabling the safety lock mode on an OCU (e.g., OCU 102, etc.). Prior to enabling the safety lock, the OCU 102 is in an unlocked state at 202. The unlocked state may be indicated by the output interface 124 (e.g., lights in a certain pattern, a message on a screen, etc.) At 204, the OCU 102 receives a request or command/instruction from a user of the OCU 102 to enable the safety lock of the OCU 102. This request may be the result of a user pressing a button, pulling a lever, interacting with a touchscreen, etc. Additionally or alternatively, the request to enable the safety lock may require a combination of inputs such as those listed above.

At 206, the OCU 102 confirms that the OCU 102 is in a lockable state. If it is not in a lockable state, the OCU 102 reverts back to its original state at 202. A lockable state may require one or more inputs and/or controls of the OCU 102 to be in defined states. For instance, if the connected RCL 104 is currently moving, the OCU 102 may not be in a lockable state and may not allow a user to engage the safety lock. As described below in FIG. 4, the OCU 102 may need to be set to Neutral position and/or Stop position before the OCU 102 enables a user to engage the safety lock mode. In some embodiments, multiple OCUs may be connected to a single RCL, with one of the OCUs being a primary OCU, where only the primary OCU may engage the safety lock mode. Accordingly, the lockable state of an OCU may be dependent on whether the OCU is the primary OCU.

In some embodiments, the system may include a primary OCU having a primary network interface in communication with a machine control unit of the RCL and a primary input interface configured to receive input commands, where the primary network interface is configured to transmit the received input commands to the machine control unit to control movement of the locomotive.

The system may also include a secondary operator control unit including a secondary network interface in communication with the machine control unit of the RCL, and a secondary input interface configured to receive input commands. The secondary operator control unit can be configured to operate in a secondary role that does not include motion control of the locomotive, and to transmit a lock command to the machine control unit to inhibit movement of the locomotive in response to receiving a lock command input at the secondary input interface.

For example, the lock command may be configured to inhibit the primary operator control unit from controlling movement of the locomotive. In this case, locking of the RCL by the secondary OCU can inhibit (e.g., prevent, etc.) movement of the RCL that would otherwise be commanded by the primary OCU. This provides protection for the operator of the secondary OCU from unexpected movement of the RCL that is commanded by the primary OCU.

The secondary OCU may be configured to transmit an unlock command to the machine control unit to allow movement of the RCL in response to receiving an unlock command input at the secondary input interface. Separately, the primary OCU may also be configured to transmit a lock command to the machine control unit to inhibit movement of the locomotive in response to receiving a lock command input at the primary input interface.

Therefore, the primary OCU and the secondary OCU may each lock the RCL from accepting movement commands from the primary OCU. In this case, only the primary OCU or the secondary OCU that previously locked movement of the RCL may be allowed to transmit an unlock command to unlock and allow movement of the RCL.

Referring again to FIG. 2, at 208, the OCU 102 has confirmed that it is in a lockable state and the OCU 102 disables motion controls and/or non-core controls. As described above, the safety lock mode causes the OCU 102 to be unable to move the connected RCL 104 in order to prevent accidental motion commands while technicians or others maybe in dangerous proximity to the RCL 104. Disabling motion controls and/or non-core controls may include disabling a throttle control, a direction control, a brake release control, etc. After the motion controls and/or non-core controls are disabled, the OCU 102 is in safety lock mode at 210. In some embodiments, safety lock mode may be evident from a state of the output interface 124 of the OCU 102. For instance, a screen of the OCU 102 may show an indicator that the OCU 102 is safety locked, or a pattern of lights (e.g., LEDS, etc.) may indicate that safety lock mode is enabled. Additionally, the OCU 102 may ring a bell, horn, or make some other audio indication that the safety lock mode is enabled.

Figure 3:
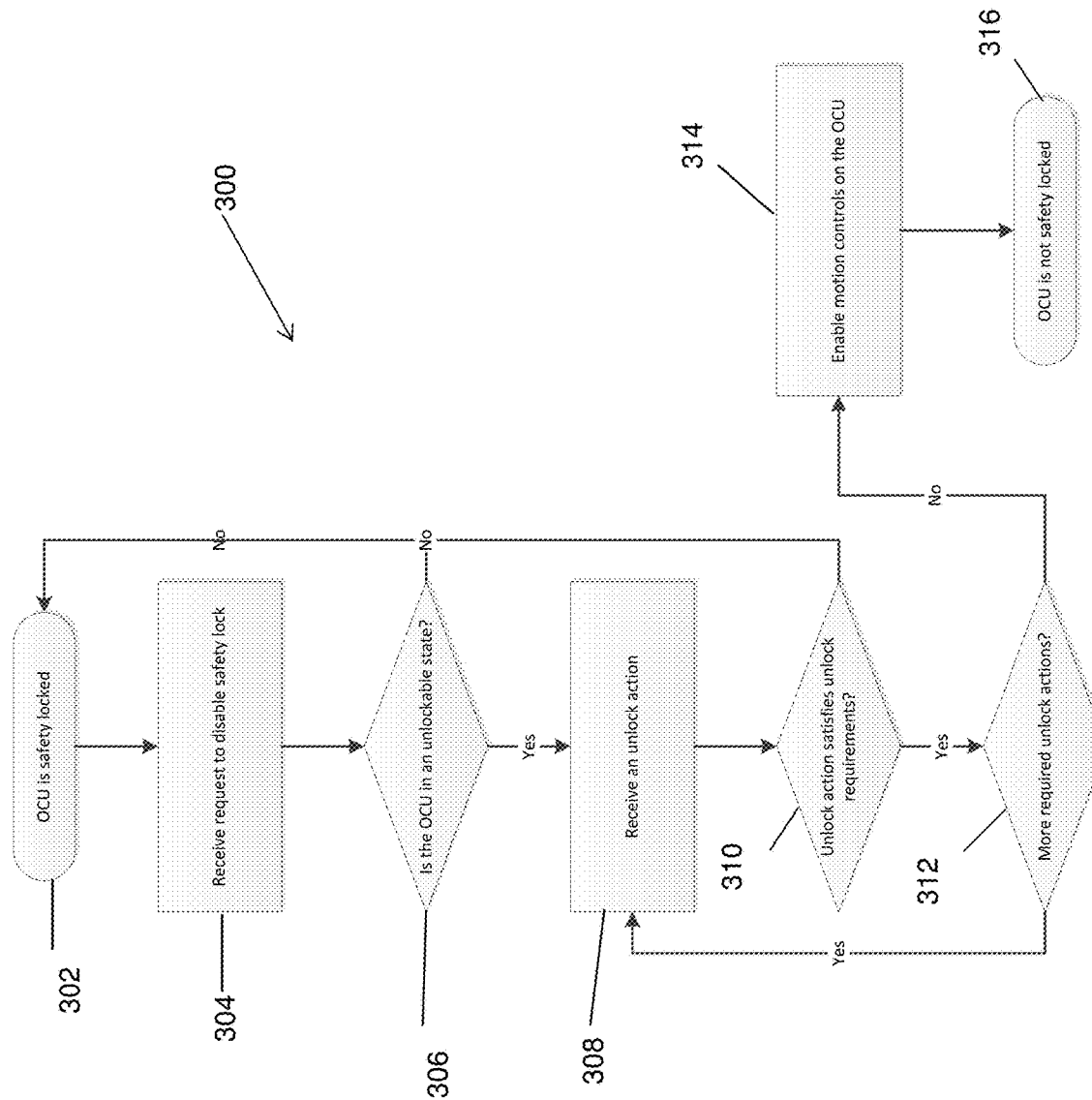
FIG. 3 is a flowchart of a method for unlocking the safety lock of the OCU of FIG. 1.

FIG. 3 illustrates a general exemplary method 300 for disabling safety lock mode of an OCU (e.g., OCU 102, etc.). At 302, the OCU 102 is in safety lock mode. As mentioned above, in some embodiments, safety lock mode may be evident from a state of the output interface 124 of the OCU 102. At 304, the OCU 102 receives a request to disable the safety lock. As with 204 of FIG. 2, this request, or command/instruction, may be the result of a user pressing a button, activating a lever, interacting with a touchscreen, or the like.

At 306, the OCU 102 determines whether the OCU 102 is in an unlockable state. Similar to the lockable state of FIG. 2, the unlockable state may be based on one or more input and/or control states of the OCU 102. For instance, if a throttle lever (and/or a direction lever, reverser, etc.) is not in neutral on the OCU 102, it may not be in an unlockable state. If not, the OCU 102 returns to the original safety locked state at 302. In some embodiments, the OCU 102 may provide a message to a user of the OCU 102 that the OCU 102 is not in an unlockable state. Additionally, the message may include a reason that the OCU 102 is not in an unlockable state and/or instructions for how to change the OCU 102 into an unlockable state. For instance, in the above example with the throttle lever, the OCU 102 may display "Set throttle lever to Neutral in order to disable Safety Lock" or a similar message.

After the OCU 102 has been confirmed to be in an unlockable state, the OCU 102 may wait to receive an unlock action at 308. As described above, unlocking the safety lock mode may include one or more interactions with the OCU 102 in order to prevent accidental unlocking of the OCU 102. An unlock action may be any suitable interaction or manipulation of the input interface 122. In some embodiments, the OCU 102 may require more than one unlock action in order to disable the safety lock, and the actions may be different from each other, require interaction with interfaces on opposite sides of the OCU 102, and/or require manipulation of interfaces in opposite directions, etc. in order to ensure that the safety lock is not accidentally disabled. For instance, in some embodiments, disabling the safety lock mode on an OCU requires moving two switches in opposite directions, wherein the two switches are on opposite sides of the OCU from each other. Additionally or alternatively, the unlock actions may require performance within a set time period.

As an example, the unlock requirements may require a predefined sequence of switch activations within a specified time period. The predefined sequence of switch activations may include activating one switch in on one side of the OCU in an upwards direction, and another switch on an opposite side of the OCU in a downwards direction. The switch activations may have to occur within a specified time period. The time period may be selected to have a short enough duration to prevent accidental unlocking of the OCU (e.g., about three seconds, about ten seconds, about one minute, etc.). The predefined sequence of activations is selected to avoid accidental unlocking of the OCU. Requiring switches on opposite sides of the OCU, requiring switch activations in different directions, requiring switch activations in a short time period, etc. each help to inhibit accidental unlocking of the OCU. It should be apparent that other unlock requirements may include more or less (or none) of the example requirements described herein, without departing from the scope of the present disclosure. Also, specific time periods (e.g., one second, three seconds, etc.) disclosed herein are example in nature and do not limit the scope of the present disclosure as other exemplary embodiments may be configured differently, e.g., with longer or shorter time periods, etc.

At 310, the OCU 102 determines if the unlock action satisfies the unlock requirements of the OCU 102. If not, the OCU 102 returns to the safety locked state at 302. If the unlock action does satisfy requirements, the OCU 102 determines whether there are additional required unlock actions at 312. If there are more required unlock actions, the OCU 102 returns to waiting for an unlock action at 308. In some embodiments, the period during which the OCU 102 waits for an unlock action may be limited, such that, if the time period expires, the OCU 102 may reset back to the safety locked state at 302. In some embodiments, the unlock requirements may require actions of the unlock procedure to be performed by multiple operators. For example, a primary operator working directly with the RCL 104 may implement an unlock action followed by an unlock action from a secondary operator, tower operator, etc., to provide confirmation that both operators are in a place of safety.

After all unlock action requirements have been satisfied, the OCU 102 enables the motion controls and/or non-core controls at 314, which controls were previously disabled when the OCU 102 is safety locked. As described above, this may include throttle controls, direction controls, brake release controls, etc. After the previously disabled controls have been enabled, the safety lock of the OCU 102 is in a disabled or unlocked state at 316. In some embodiments, disabling the safety lock mode may be evident from a state of the output interface 124 of the OCU 102. For instance, a screen of the OCU 102 may show an indicator that the OCU 102 safety lock is disabled, or a pattern of lights (e.g., LEDS, etc.) may indicate that safety lock mode is disabled. Additionally, the OCU 102 may ring a bell, horn, or make some other audio indication that the safety lock mode is disabled.

Figure 4:
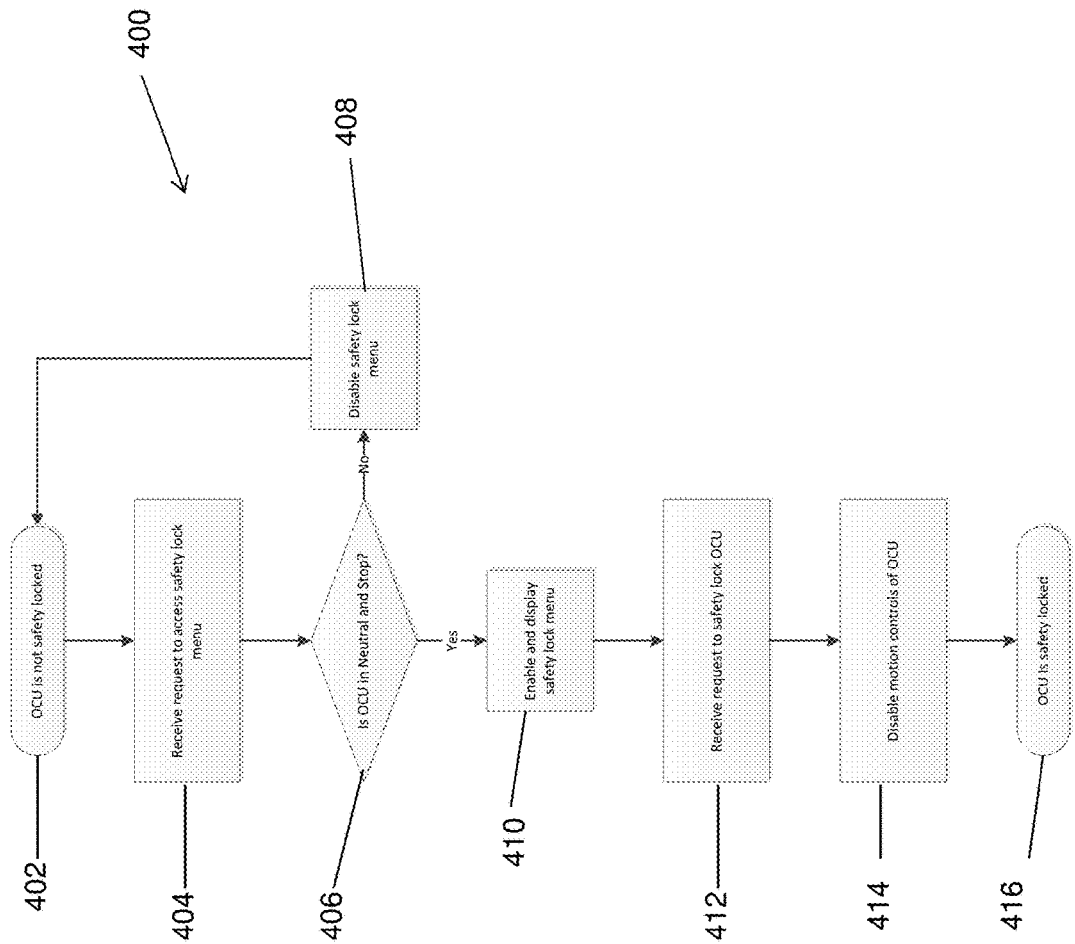
FIG. 4 is a flowchart of another exemplary method for safety locking the OCU of FIG. 1.
Figure 5:
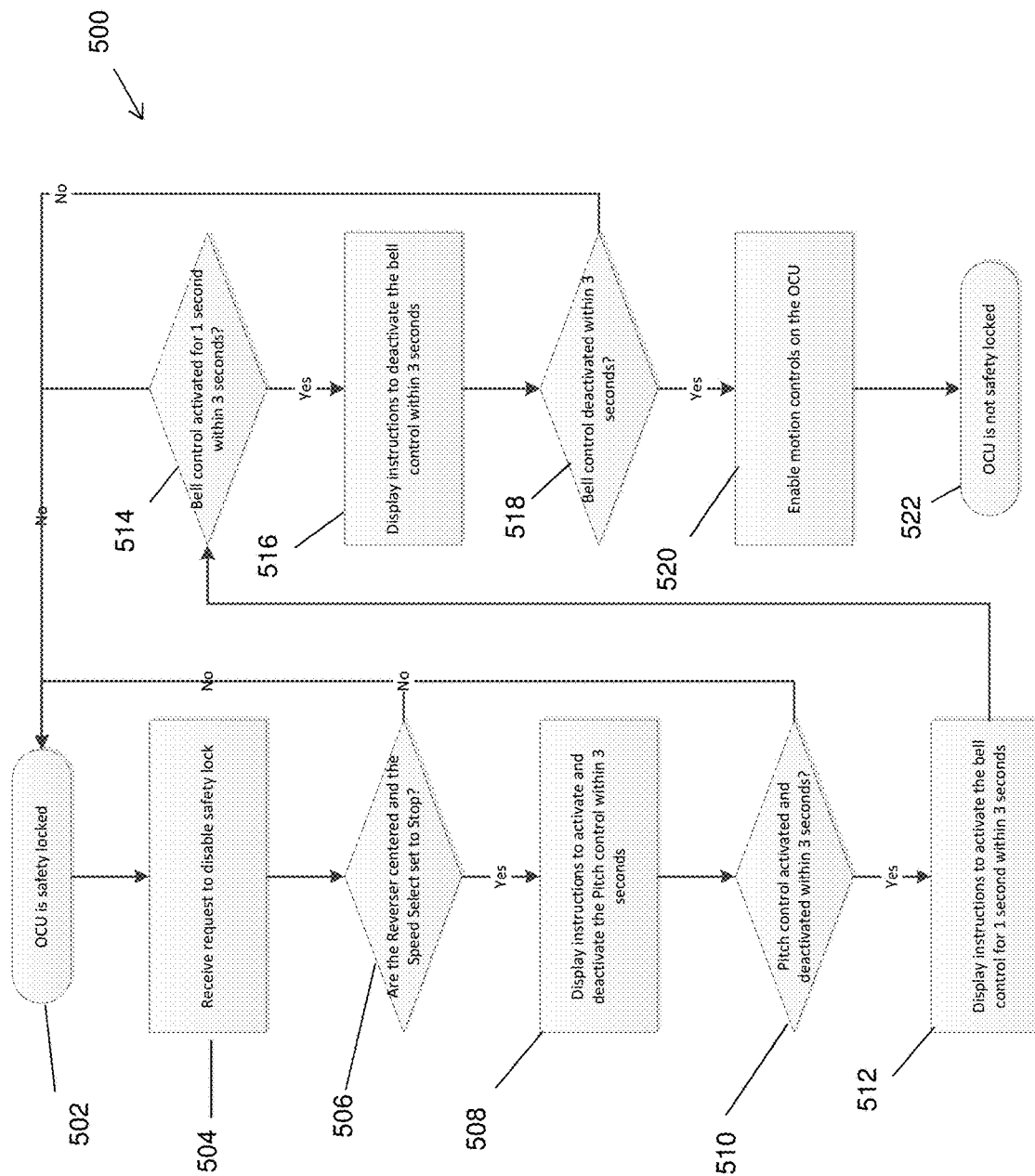
FIG. 5 is a flowchart of another exemplary method for unlocking a safety lock of the OCU of FIG. 1.

FIGS. 4 and 5 are included to provide additional examples of methods for enabling and disabling the safety lock mode on an OCU (e.g., OCU 102, etc.). It should be understood that the details included in FIGS. 4 and 5 and the descriptions thereof are exemplary and not limiting. Other embodiments may include all, some, or none of the steps and/or details included in the descriptions of FIGS. 4 and 5.

FIG. 4 illustrates an exemplary method 400 of enabling the safety lock mode on OCU 102. At 402, the safety lock mode of OCU 102 is not enabled. At 404, the OCU 102 receives a request to access a safety lock menu. In the exemplary embodiment of FIG. 4, the OCU 102 includes a touchscreen as described above for providing input interfaces 122 and output interfaces 124 to a user of the OCU 102. The safety lock module 118 includes instructions for displaying a system of menus, buttons, and other user interface elements to enable the user of the OCU 102 to enter commands, instructions, and or requests. The request to access the safety lock menu may be the result of the user of the OCU 102 touching a button on the touchscreen.

At 406, the OCU 102 determines whether the OCU 102 is in a lockable state, which, in the embodiment of FIG. 4, requires that the OCU 102 be in Neutral and Stop modes and/or positions. If the OCU 102 is not in Neutral and Stop modes, the safety lock menu may be disabled at 408 and the OCU 102 returns to its original unlocked state at 402. In some embodiments, this may be accompanied by a message to the user of the OCU 102 that the OCU 102 is not in a lockable state. Additionally, the message may include instructions for how to bring the OCU 102 into a lockable state.

If the OCU 102 is in Neutral and Stop, the OCU 102 enables and displays the safety lock menu on the screen interface of the OCU 102. After being enabled, the OCU 102 receives a request by the user to enable the safety lock mode on the OCU at 412. The request may, again, be the result of the user touching a button, control, or the like on the touchscreen interface of the OCU 102. As a result of the request, the OCU 102 disables motion controls and/or non-core controls at 414 and the OCU 102 is in safety lock mode at 416.

FIG. 5 illustrates an exemplary method 500 of disabling the safety lock mode on OCU 102. At 502, the OCU 102 safety lock mode is enabled. At 504, the OCU 102 receives a request to disable the safety lock. As above, the request may be the result of a user of the OCU 102 pressing a button or the like of the input interface 122. At 506, the OCU 102 determines whether a Reverser control is centered and a Speed Select control is set to stop. As above in FIG. 3, the OCU 102 must be in an unlockable state to be unlocked. In the exemplary embodiment of FIG. 5, the Reverser control must be centered and the Speed Select control must be set to stop for the OCU 102 to be in an unlockable state. If the OCU 102 is not in the described state, it returns to the safety locked state at 502.

When the check at 506 succeeds, the OCU 102 displays instructions to activate and deactivate the Pitch control within three seconds. The instructions may be displayed on a screen of the output interface 124 of the OCU 102. After displaying the instructions, the OCU 102 determines whether the Pitch control is activated within three seconds at 510. If not, the OCU 102 returns to the safety locked state at 502.

If the Pitch control instruction is satisfied, the OCU 102 displays instructions to activate the Bell control for one second within three seconds at 512. After displaying the Bell control instructions, the OCU 102 determines whether the Bell control is activated for one second within three seconds at 514. If not, the OCU 102 returns to the safety locked state at 502.

When the bell control is successfully activated, the OCU 102 displays instructions to deactivate the bell control within three seconds at 516. The OCU 102 determines whether the bell control is deactivated within three seconds at 518. If not, the OCU returns to the safety locked state at 302.

If the bell control instruction is successfully followed by the user of the OCU 102, the OCU 102 enables motion controls and/or non-core controls at 520 and the OCU 102 safety lock mode is disabled at 522.

Figure 6:
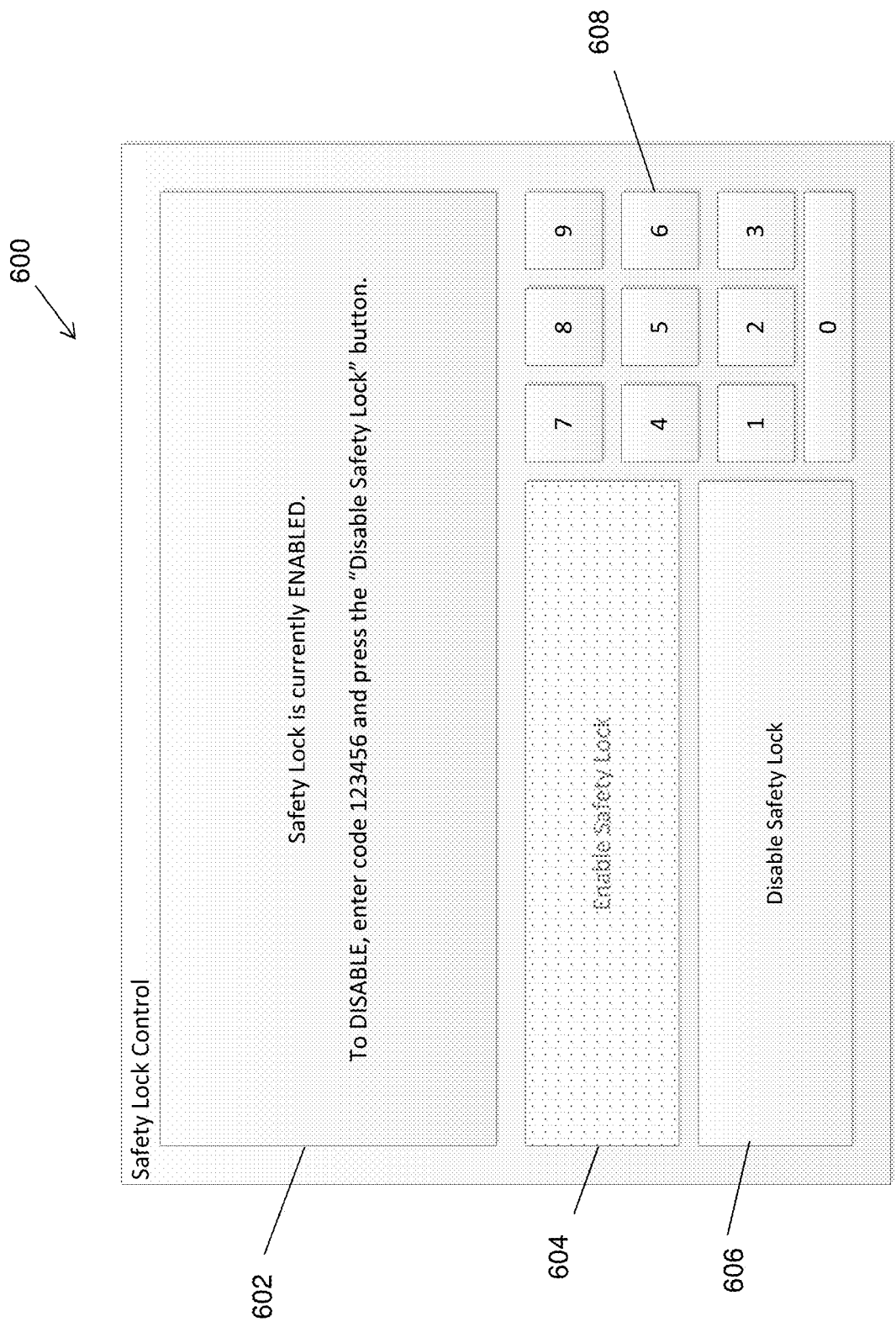
FIG. 6 is an exemplary user interface for use in unlocking a safety lock mode of the OCU of FIG. 1.

FIG. 6 illustrates an exemplary user interface 600 of an OCU (e.g., OCU 102) in a safety locked state. It should be understood that user interface 600 is exemplary and not limiting. Some embodiments may make use of all, some, or none of the elements shown in user interface 600 and/or described below.

The user interface 600 of OCU 102 includes an information section 602 that displays information about the safety lock mode and/or the current state of the safety lock mode. In the embodiment of FIG. 6, the information section 602 displays a message instructing a user of the OCU 102 that the safety lock is enabled and the information section 602 provides instructions regarding necessary steps to disable the safety lock.

The user interface 600 further includes an "Enable Safety Lock" button 604, a "Disable Safety Lock" button 606, and a numeric key pad 608. The enable button 604 is shown as "grayed out", indicating that it is not available for interaction due to the OCU 102 already being in a safety locked state. If the safety lock mode of the OCU 102 is disabled, the enable button 604 may no longer be "grayed out" and may be available to the user for interaction.

The disable button 606 is not "grayed out" and may be activated. But activating the disable button 606 alone may not be all that is needed to disable the safety lock mode. As described above, in some embodiments, disabling safety lock mode requires more than one separate action in order to reduce the chance that safety lock mode is disabled accidentally. In the exemplary embodiment of FIG. 6, the information section 602 includes instructions for disabling the safety lock mode. The user is instructed to enter code "123456" on the numeric key pad 608 followed by pressing the Disable Safety Lock button 606. By including a step for entering a multi-digit code, the chance of accidentally disabling the safety lock mode is reduced. It should be understood that a code entry step may require more, fewer, or different numbers. Alternatively or additionally, the code may also require letters, symbols, and the like.

In the embodiment of FIG. 6, the user interface 600 is a touchscreen interface with buttons 604 and 606, and keypad 608, displayed on the touchscreen for interaction. Due to the dynamic nature of the interactive surface of the touchscreen interface, it should be understood that, in alternative embodiments, the button regions may be located and/or shaped differently in the interface. It should also be understood that, in alternative embodiments, the buttons 604 and 606 and the keypad 608 may include physical buttons, switches, or the like.

In another example embodiment, a system for enabling and disabling a safety lock mode of a remote control locomotive includes a machine control unit located on a locomotive to control operation of the locomotive, a primary operator control unit including a primary network interface in communication with the machine control unit, and a primary input interface configured to receive input commands. The primary network interface is configured to transmit the received input commands to the machine control unit to control movement of the locomotive.

The system also includes a secondary operator control unit including a secondary network interface in communication with the machine control unit, and a secondary input interface configured to receive input commands.

The system is configurable between a first lock setting where only the primary operator control unit is allowed to lock movement of the locomotive, a second lock setting where only the secondary operator control unit is allowed to lock movement of the locomotive, or a third lock setting where both the primary operator control unit and the secondary operator control unit are allowed to lock movement of the locomotive.

In some cases, the machine control unit includes a memory configured to store (e.g., encode, etc.) a currently configured one of the first lock setting, the second lock setting and the third lock setting. For example, the machine control unit could store the currently configured lock setting in a binary configuration file (BCF) in the memory of the machine control unit. The BCF can configure features, options, etc., of the RCL.

The machine control unit may be configured to transmit the currently configured lock setting to the primary operator control unit when the primary operator control unit is paired with the machine control unit, and to transmit the currently configured lock setting to the secondary operator control unit when the secondary operator control unit is paired with the machine control unit.

Alternatively, or in addition, a currently configured one of the first lock setting, the second lock setting and the third lock setting is stored in a memory (e.g., a configuration file, etc.) of the primary operator control unit and a memory of the secondary operator control unit. In this case, the currently configured lock setting may not be exchanged with the machine control unit when the primary operator control unit is paired with the machine control unit and when the secondary operator control unit is paired with the machine control unit.

In another example embodiment, a system for enabling and disabling a safety lock mode of a remote control locomotive includes a machine control unit located on a locomotive to control operation of the locomotive. The machine control unit includes a memory configured to log data for operation of the locomotive.

The system also includes an operator control unit having a network interface in communication with the machine control unit, and an input interface configured to receive input commands. The network interface is configured to transmit a lock status to the machine control unit in a radio frequency telegram, where the lock status indicative of whether a lock command input has been received at the input interface.

For example, a radio frequency telegram may include data sent over a radio frequency (RF) link between the operator control unit and the machine control unit, which could be transmitted in either direction. The operator control unit can include a lock status in the radio frequency telegram to indicate to the machine control unit whether the operator control unit is in a locked mode. In some embodiments, the machine control unit may transmit a lock status to one or more operator control units.

The memory of the machine control unit may include an archive record. In that case, the machine control unit can be configured to log a state of the received lock status in the archive record stored in the memory of the machine control unit. For example, the RCL may include onboard data logging for multiple purposes, including troubleshooting, incident recreation, website reporting (e.g., via the TAS-VERII website reporting system, etc.), alert generation, etc.

The archive record may be stored in any suitable memory location of the RCL, such as non-volatile random access memory (RAM), etc. In some cases, the archive record may be copied to cloud storage remote from the RCL (e.g., for TASVERII subscriber customers to access, etc.).

The operator control unit may be configured to operate in a secondary role that does not include motion control of the locomotive. In this case, the machine control unit can be configured to inhibit movement of the locomotive when the lock status logged in the archive record indicates a lock command input was received at the input interface of the operator control unit. This can facilitate locking of the locomotive movement by an operator control unit that is operating in a secondary role without motion control.

Embodiments of the foregoing OCU system can make it possible to effectively and safely lock the controls of a wide range of machine types, including but not limited to remote control locomotives, other types of remote control vehicles and devices, and various kinds of distributed machines, while maintaining core and/or safety functionality.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein. As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following steps: (a) receiving, by an operator control unit, a request to disable a safety lock mode of the operator control unit via an input interface of the operator control unit; (b) when the operator control unit is in an unlockable state, receiving, by the operator control unit, at least one unlock action via the input interface; and (c) when the at least one unlock action satisfies unlock requirements of the operator control unit, enabling, by the operator control unit, motion controls of the operator control unit.

Exemplary embodiments of Operator Control Unit (OCU) systems disclosed herein may be used for monitoring and/or controlling distributed machines, e.g., remotely controlled locomotives (RCLs) moving in a rail yard, etc. By way of an example, an exemplary embodiment of an OCU may be used to deactivate the motion controls of a connected RCL while maintaining access to the core operations in order to enhance the safety of any personnel that may be working on or nearby the RCL. The exemplary OCU provides a multi-step method to enable the motion controls of the RCL that is made up of activation of several different controls on various locations of the OCU to decrease the chance of accidental activation. The OCU may provide prompts to instruct a user of what steps are necessary to disable the safety lock and enable the motion controls of the RCL.

It should be noted, however, that although various embodiments are described with reference to RCLs and rail yard operations, the disclosure is not so limited. Aspects of the disclosure may be practiced in connection with various types of remote control machines distributed in various types of environments, including, but not limited to, medical devices in hospitals, inventory devices in warehouses, machines that are manageable via automatic identification and data capture (AIDC) applications, etc.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific time periods, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for enabling and disabling a safety lock mode of a remote control locomotive, the system comprising:
    a machine control unit located on a locomotive to control operation of the locomotive;
    a primary operator control unit including a primary network interface in wireless communication with the machine control unit, and a primary input interface configured to receive input commands, the primary network interface configured to transmit the received input commands to the machine control unit to control movement of the locomotive; and
    a secondary operator control unit including a secondary network interface in wireless communication with the machine control unit, and a secondary input interface configured to receive input commands, wherein:
        the secondary operator control unit is configured to operate in a primary role that includes motion control including one or more of a throttle control, a direction control, and a brake release control, and in a secondary role that does not include the one or more of the direction control, the throttle control, and the brake release control of the locomotive; and
        the secondary operator control unit is configured to operate in the secondary role that includes transmitting a lock command to the machine control unit to lock the locomotive and thereby inhibit the primary operator control unit from controlling movement of the locomotive in response to receiving a lock command input at the secondary input interfaces;
    wherein the primary operator control unit is configured to transmit a lock command to the machine control unit to inhibit movement of the locomotive in response to receiving a lock command input at the primary input interface;
    wherein the primary operator control unit and the secondary operator control unit are each configurable for operation in the primary role that includes the motion control and in the secondary role without motion control, such that the primary and secondary roles of the primary operator control unit and the secondary operator control unit are exchangeable; and
    wherein only the primary operator control unit or the secondary operator control unit that initially locked movement of the locomotive can transmit an unlock command to unlock and allow movement of the locomotive.

2. The system of claim 1, wherein the secondary operator control unit is configured to transmit the lock command when operating in the secondary role without motion control, to thereby lock the locomotive from accepting movement commands from the primary operator control unit and inhibit the primary operator control unit from initiating movement of the locomotive, whereby the system is operable for providing protection for an operator of the secondary operator control unit from unexpected movement of the locomotive commanded by the primary operator control unit.

3. The system of claim 1, wherein the secondary operator control unit is configured to transmit an unlock command to the machine control unit to allow movement of the locomotive in response to receiving an unlock command input at the secondary input interface.

4. The system of claim 1, wherein the secondary operator control unit is configured to operate in the secondary role that includes core non-motion controls including at least one of an operator emergency, tilt protection, tilt extend protection, horn operation, bell operation, train brake operation, and penalty operations generated by the locomotive.

5. The system of claim 1, wherein the primary operator control unit is configured to:
disable motion controls of the locomotive while maintaining wireless communication with the machine control unit to allow core non-motion controls of the locomotive, in response to receiving the lock command at the primary input interface; and
in response to a predefined sequence of activations of multiple inputs of the primary input interface during a specified time period, enable motion controls of the locomotive.

6. The system of claim 5, wherein
the core non-motion controls include at least one of an operator emergency, tilt protection, tilt extend protection, horn operation, bell operation, train brake operation, and penalty operations generated by the locomotive.

7. The system of claim 6, wherein:
the multiple inputs include a first switch and a second switch located on an opposite side of the primary operator control unit from the first switch; and
the predefined sequence of activations includes activation of the first switch and activation of the second switch.

8. The system of claim 1, wherein:
the primary input interface of the primary operator control unit includes a turn-key mechanism;
the primary operator control unit is configured to transmit a request to disable motion controls of the locomotive in response to turning a key in the turn-key mechanism to a first position; and
the primary operator control unit is configured to transmit a request to enable motion controls of the locomotive in response to turning a key in the turn-key mechanism to a second position.

9. A system for enabling and disabling a safety lock mode of a remote control locomotive, the system comprising:
a machine control unit located on a locomotive to control operation of the locomotive;
a primary operator control unit including a primary network interface in wireless communication with the machine control unit, and a primary input interface configured to receive input commands, the primary network interface configured to transmit the received input commands to the machine control unit to control movement of the locomotive; and
a secondary operator control unit including a secondary network interface in wireless communication with the machine control unit, and a secondary input interface configured to receive input commands;
wherein the system is configurable between a first lock setting where only the primary operator control unit is allowed to lock movement of the locomotive, a second lock setting where only the secondary operator control unit is allowed to lock movement of the locomotive, or a third lock setting where both the primary operator control unit and the secondary operator control unit are allowed to lock movement of the locomotive; and
wherein the primary operator control unit and the secondary operator control unit are each configurable for operation in a primary role that includes motion control including one or more of a throttle control, a direction control, and a brake release control, and in a secondary role that does not include the one or more of the direction control, the throttle control, and the brake release control of the locomotive, such that the primary and secondary roles of the primary operator control unit and the secondary operator control unit are exchangeable;
wherein the secondary operator control unit is configured to operate in the secondary role that includes transmitting a lock command to the machine control unit to lock the locomotive and thereby inhibit the primary operator control unit from controlling movement of the locomotive in response to receiving a lock command input at the secondary input interface;
wherein the primary operator control unit is configured to transmit a lock command to the machine control unit to inhibit movement of the locomotive in response to receiving a lock command input at the primary input interface;
wherein only the primary operator control unit or the secondary operator control unit that initially locked movement of the locomotive can transmit an unlock command to unlock and allow movement of the locomotive.

10. The system of claim 9, wherein the secondary operator control unit is configured to operate in the secondary role that includes core non-motion controls including at least one of an operator emergency, tilt protection, tilt extend protection, horn operation, bell operation, train brake operation, and penalty operations generated by the locomotive.

11. The system of claim 10, wherein the machine control unit includes a memory configured to store a currently configured one of the first lock setting, the second lock setting and the third lock setting, and wherein only the primary operator control unit or the secondary operator control unit that initially locked movement of the locomotive can transmit an unlock command to unlock and allow movement of the locomotive.

12. The system of claim 11, wherein the machine control unit is configured to store the currently configured lock setting in a binary configuration file in the memory of the machine control unit.

13. The system of claim 11, wherein the machine control unit is configured to transmit the currently configured lock setting to the primary operator control unit when the primary operator control unit is paired with the machine control unit, and to transmit the currently configured lock setting to the secondary operator control unit when the secondary operator control unit is paired with the machine control unit.

14. The system of claim 10, wherein a currently configured one of the first lock setting, the second lock setting and the third lock setting is stored in a memory of the primary operator control unit and a memory of the secondary operator control unit.

15. The system of claim 14, wherein the currently configured lock setting is not exchanged with the machine control unit when the primary operator control unit is paired with the machine control unit and when the secondary operator control unit is paired with the machine control unit.

16. A system for enabling and disabling a safety lock mode of a remote control locomotive, the system comprising:
- a machine control unit located on a locomotive to control operation of the locomotive, the machine control unit including a memory configured to log data for operation of the locomotive; and
- first and second operator control units each including a network interface in wireless communication with the machine control unit, and an input interface configured to receive input commands, each of the first and second operator control units configurable for operation in a primary role that includes motion control including one or more of a throttle control, a direction control, and a brake release control, and in a secondary role that does not include the one or more of the direction control, the throttle control, and the brake release control of the locomotive, whereby the primary and secondary roles of the first and second operator control units are exchangeable;
- wherein the network interface of each of the first and second operator control units is configured to transmit a lock status to the machine control unit in a radio frequency telegram to lock the locomotive and inhibit movement of the locomotive, the lock status indicative of whether a lock command input has been received at the input interface of the first or second operator control unit; and
- wherein only the first operator control unit or the second operator control unit that initially locked movement of the locomotive can transmit an unlock command to unlock and allow movement of the locomotive.

17. The system of claim 16, wherein:
- the memory of the machine control unit includes an archive record; and
- the machine control unit is configured to log a state of the received lock status in the archive record stored in the memory of the machine control unit.

18. The system of claim 17, wherein the machine control unit is configured to inhibit movement of the locomotive when the lock status logged in the archive record indicates a lock command input was received at the input interface of the first or second operator control unit.

19. The system of claim 16, wherein the machine control unit is configured to transmit a lock status to the first and second operator control units.

20. The system of claim 16, wherein the first or second operator control unit in the primary role is configured to:
- disable the motion controls of the locomotive while maintaining wireless communication with the machine control unit to allow core non-motion controls of the locomotive, in response to receiving the lock command at the input interface; and
- in response to a predefined sequence of activations of multiple inputs of the input interface during a specified time period, enable motion controls of the locomotive.

* * * * *